United States Patent
Prunicki et al.

(10) Patent No.: US 9,280,339 B1
(45) Date of Patent: Mar. 8, 2016

(54) CLASS REPLACER DURING APPLICATION INSTALLATION

(71) Applicant: Amazon Technologies, Inc., Reno, NV (US)

(72) Inventors: Andrew Eugene Prunicki, Pleasanton, CA (US); Jianming Wu, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/104,800

(22) Filed: Dec. 12, 2013

(51) Int. Cl.
    *G06F 9/44* (2006.01)
    *G06F 9/445* (2006.01)

(52) U.S. Cl.
    CPC ........................................ *G06F 8/65* (2013.01)

(58) Field of Classification Search
    None
    See application file for complete search history.

(56) References Cited

U.S. PATENT DOCUMENTS

| | | | |
|---|---|---|---|
| 5,815,721 A * | 9/1998 | Benitez ........................ | 717/160 |
| 6,072,953 A * | 6/2000 | Cohen et al. ................. | 717/166 |
| 7,657,881 B2 * | 2/2010 | Nagendra et al. ............. | 717/152 |
| 7,665,075 B1 * | 2/2010 | Daynes et al. ................ | 717/148 |
| 7,805,718 B2 * | 9/2010 | Baldischweiler et al. .... | 717/159 |
| 8,726,247 B2 * | 5/2014 | Wilkinson et al. ............ | 717/139 |
| 2006/0069849 A1 * | 3/2006 | Rudelic ........................ | 711/103 |
| 2009/0300594 A1 * | 12/2009 | Kozhukh ..................... | 717/168 |
| 2012/0159468 A1 * | 6/2012 | Joshi et al. ................... | 717/172 |
| 2012/0284704 A1 * | 11/2012 | Friedman et al. ............. | 717/177 |
| 2013/0047150 A1 * | 2/2013 | Malasky et al. .............. | 717/176 |
| 2014/0245275 A1 * | 8/2014 | Elias et al. ................... | 717/168 |

OTHER PUBLICATIONS

"Applied Cracking & Byte Patching with IDA Pro." Reverse Engineering. InfoSec Institute, Dec. 5, 2013. Web. Feb. 28, 2015. <http://resources.infosecinstitute.com/applied-cracking-byte-patching-ida-pro/>.*

Long, Alex. "How to Hack Your Game Saves: A Basic Guide to Hex Editing." WonderHowTo. N.p., Nov. 26, 2012. Web. Feb. 28, 2015. <http://web.archive.org/web/20121126143539/http://null-byte.wonderhowto.com/how-to/hack-your-game-saves-basic-guide-hex-editing -0132155>.*

* cited by examiner

*Primary Examiner* — Wei Zhen
*Assistant Examiner* — Binh Luu
(74) *Attorney, Agent, or Firm* — Sutherland Asbill & Breannan LLP

(57) ABSTRACT

This disclosure describes systems, methods, and computer-readable media related to online advertisement campaign recommendations. An archive file may be received from a server. The archive file may include one or more compiled code files and a manifest file. The archive file may be unpackaged. The one or more compiled code files may be optimized based at least in part on the manifest file. The optimizing the one or more compiled code files may include identifying a first sequence of bytes and a second sequence of bytes from one or more sources; formatting the second sequence of bytes based at least in part on one or more rules; searching the one or more compiled code files to identify one or more sequence of bytes matching the first sequence of bytes; and replacing the identified one or more sequence of bytes with the formatted second sequence of bytes. The optimized compiled code files may be stored.

18 Claims, 4 Drawing Sheets

CLASS REPLACER DURING APPLICATION INSTALLATION

BACKGROUND

Applications and software packages may be developed for different types of devices, such as cell phones, tablets, laptops, and the like. Software developers may create the applications and software packages using specific libraries and application programming interfaces (APIs). The applications and software packages may need to be updated in order to work properly on specific user devices. However, updating specific lines of code in the application and software packages to replace class or package names may be a tedious and inaccurate, especially as the different class or package names may involve drastically different naming conventions and files paths.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
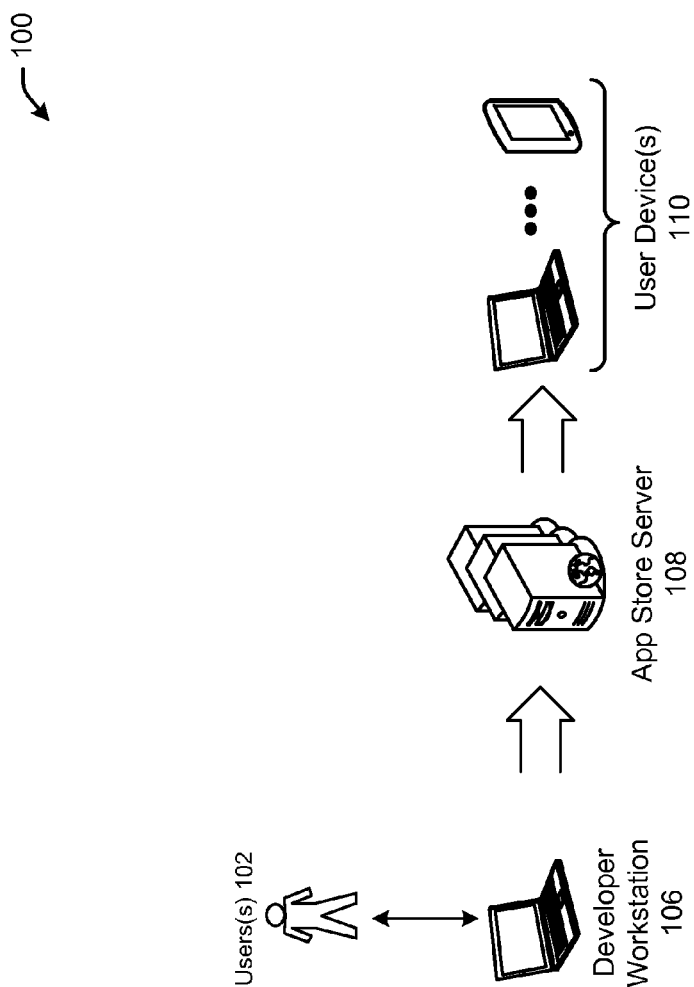
FIG. 1 depicts an illustrative data flow between various components of an illustrative system architecture for a class replacer during application installation in accordance with one or more embodiments of the disclosure.

The process for updating software packages or applications for specific user devices may be cumbersome or imprecise, thus resulting in inefficient and failed installation of the software packages or applications on user devices. A class replacer may enable software packages or applications to be updated efficiently and accurately for different user devices. Specific class names or package names may be identified in one or more sources to be replaced by a different sequence of bytes. Each user device may update the software packages or applications during installation without the need to have different software packages or applications developed for each specific user device.

This disclosure relates to, among other things, systems, methods, computer-readable media, techniques and methodologies for a class replacer during application installation. An application developer may develop an application or software package for distribution to user devices. The class replacer may enable a framework to change linkage of the application or software package at install time from what the application or software package was compiled against prior to distribution. For instance, the application developer may have developed the application or software package using a particular library. However, in order for the application or software package to work properly on a specific tablet device, the application or software package may need to utilize a different library. The class replacer enables the framework to efficiently and accurately update the linkage of the application or software package to the new library without having to individually update each compiled code file associated with the software package or application.

In some embodiments, the software package or application may be distributed as an archive file, such as a Java Archive (JAR) or Dalvik Executable (DEX) file. The archive file may include one or more compiled code files. In some embodiments, the archive file may also include resources, such as videos, images, sounds, or the like, and metadata. The archive file may include instructions or indications of replacement sequence of bytes pairs to update the compiled code files for a particular user device. The user device may receive the archive file and unpackage the archive file. The user device may identify the replacement sequence of bytes pairs that include at least a first sequence of bytes that is to be replaced by a second sequence of bytes. The second sequence of bytes may be formatted based at least in part on one or more rules. In some embodiments, one or more rules may be applied to the first and second sequence of bytes to simulate output of a compiler. The compiled code files may be systematically searched to identify all sequence of bytes matching the first sequence of bytes. All identified sequence of bytes matching the first sequence of bytes may be replaced by the second sequence of bytes. The updated compiled code files may then be stored by the user device.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

FIG. 1 depicts an illustrative data flow between various components of an illustrative system architecture for a class replacer during application installation in accordance with one or more embodiments of the disclosure. One or more illustrative developer workstation(s) 106 operable by one or more users 102 are illustratively depicted in FIG. 1 The developer workstation(s) 106 may include any suitable device capable of developing applications and receiving and transmitting data with other computing devices. The developer workstation(s) 106 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the developer workstation(s) 106 and the user(s) 102 may be described herein in the singular; however, it should be appreciated that multiple developer workstation(s) 106 operable by multiple users 102 may be provided.

In various example embodiments, a user application (e.g., a browser application) executing on a developer workstation 106 may communicate with an app store sever 108. The user 102 may be a developer who developed an application and is transmitting or uploading the files associated with the application to the app store server 108 for distribution to different user device(s) 110. In some embodiments, the user 102 may sign into a web interface for the app store using the developer workstation 106. The user 102 may upload or otherwise make available the application developed by the user 102 to the app store server 108. In some embodiments, the user 102 may upload or make available an archive file. The archive file may include one or more compiled code files, such as a Java class file, and a manifest file.

The app store server 108 may receive the application from the user 102. The app store server 108 may determine one or more class or package names need to be modified or updated. In some embodiments, the app store server 108 may transmit a request to the user 102 to update or modify the files associated with the application. Responsive to receiving approval from the user 102, the app store server 108 may unpackage the archive file and modify the manifest file to include instructions to replace specified sequence of bytes in the compiled code files during installation on the user device 110. The app store server 108 may repackage the archive file with the modified manifest file. The app store server 108 may transmit the updated archive file to one or more user devices 110.

One or more illustrative user device(s) 110 operable by one or more users 102 are illustratively depicted in FIG. 1 The user device(s) 110 may include any suitable device capable of developing applications and receiving and transmitting data with other computing devices. The user device(s) 110 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the user device(s) 110 may be described herein in the singular; however, it should be appreciated that multiple user device(s) 110 may be provided. The user device(s) 110 may transmit a request to the app store server 108 to download an application. Responsive to the request, the app store server 108 may transmit the archive file to the requesting user device 110. The user device 110 may receive the archive file, unpackage the archive file, and optimize the compiled code files based at least in part on the instructions in the manifest file. During the optimization, a module of the user device 110 may parse the manifest file to identify a pair of replacement sequence of bytes to replace in the compiled code files. In some embodiments, the replacement sequence of bytes pair may be separated by a colon. Additional replacement sequence of bytes pairs may be supplied and separated by commas. Sequence of bytes may be replaced in-order where the first match wins.

Figure 2:
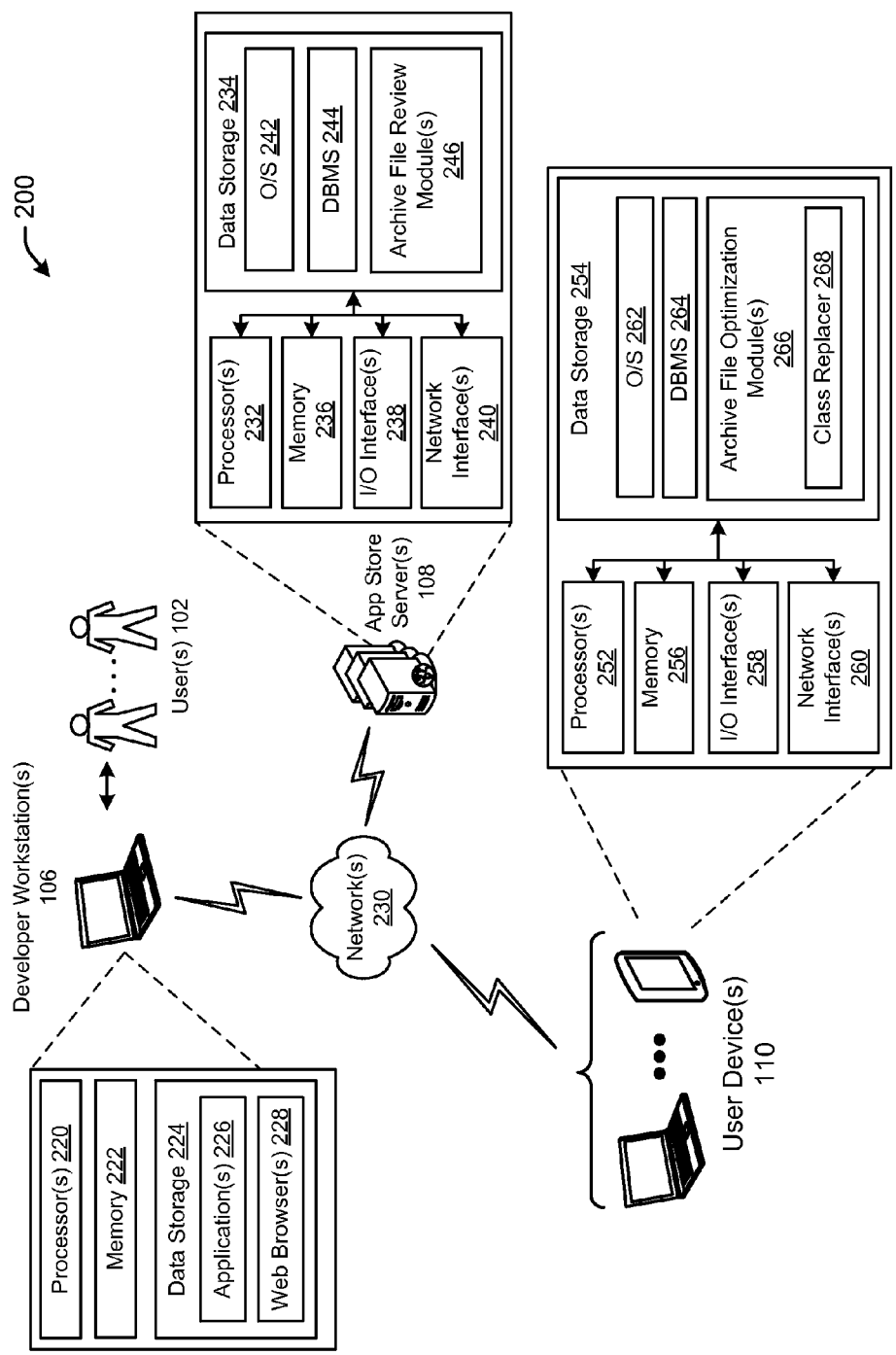
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more developer workstation(s) 106 operable by one or more users 102, one or more app store server(s) 108 and/or one or more user device(s) 110. The developer workstation(s) 106, app store server(s) 108, and/or user device(s) 110 may include any of the types of devices described through reference to FIG. 1.

Any of the developer workstation(s) 106, app store server(s) 108, and/or user device(s) 110 may be configured to communicate with each other and any other component of the system architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The developer workstation(s) 106 may include one or more processor(s) 220 that may include any suitable processing unit capable of accepting digital data as input, processing the input data based on stored computer-executable instructions, and generating output data. The computer-executable instructions may be stored, for example, in the data storage 224 and may include, among other things, operating system software and application software. The computer-executable instructions may be retrieved from the data storage 224 and loaded into the memory 222 as needed for execution. The processor(s) 220 may be configured to execute the computer-executable instructions to cause various operations to be performed. The processor(s) 220 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 224 may store program instructions that are loadable and executable by the processor(s) 220, as well as data manipulated and generated by the processor(s) 220 during execution of the program instructions. The program instructions may be loaded into the memory 222 as needed for execution. Depending on the configuration and implementation of the developer workstation(s) 106, the memory 222 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 222 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 224 that may comprise computer-executable instructions that when executed by the processor(s) 220 cause various operations to be performed. The memory 222 may have loaded from the data storage 224 one or more operating systems (O/S) that may provide an interface between other application software (e.g., dedicated applications, a browser application, a web-based application, a distributed client-server application, etc.) executing on the developer workstations 106 and the hardware resources of the developer workstations 106. More specifically, the O/S may include a set of computer-executable instructions for managing the hardware resources of the developer workstations 106 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 224 may additionally include various other program modules that may include computer-executable instructions for supporting a variety of associated functionality. For example, the data storage 224 may include one or more application(s) 226 and/or one or more web browser(s) 228. In some embodiments, one or more application(s) 226 may be used to develop an application or software package by the user 102, generate an archive file based at least in part on developed application or software package, and transmit the generated archive file to an app store server 108. In some embodiments, a user may launch a web browser 228 to communicate and/or exchange information with one or more app store server(s) 108.

The app store server(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the app store server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The app store server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The app store server(s) 108 may further include network interface(s) 240 that facilitate communication between the app store server(s) 108 and other devices of the illustrative system architecture 200 (e.g., developer workstation(s) 106, user device(s) 110, etc.) or application software via the network(s) 230. The app store server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the app store server(s) 108 and the hardware resources of the app store server(s) 108. More specifically, the O/S 242 may include a set of computer-executable instructions for managing the hardware resources of the app store server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more archive file review module(s) 246. The archive file review module(s) 246 may include computer-executable instructions that in response to execution by the processor(s) 232 cause operations to be performed including determining that the compiled code files may need to be updated, generating a request to the user that developed or generated the archive file to request permission or approval to update the compiled code files, modifying the manifest file based at least in part on the permission or approval from the user, and then preparing and transmitting the archive file to one or more requesting user devices 110 for installation.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The user device(s) 110 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the user device(s) 110, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 110 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The user device(s) 110 may further include network interface(s) 260 that facilitate communication between the user device(s) 110 and other devices of the illustrative system architecture 200 (e.g., developer workstation(s) 106, app store server(s) 108, etc.) or application software via the network(s) 230. The user device(s) 110 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the user device(s) 110 and the hardware resources of the user device(s) 110. More specifically, the O/S 262 may include a set of computer-executable instructions for managing the hardware resources of the user device(s) 110 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more archive file optimization module(s) 266. The archive file optimization module 266 may include one or more class replacer(s) 268.

The archive file optimization module(s) 266 may include computer-executable instructions that in response to execution by the processor(s) 252 cause operations to be performed including receiving an archive file, unpackaging the archive file, and/or optimizing the archive file based at least in part on information obtained from the manifest file. In some embodiments, the archive file optimization module(s) 266 may parse the manifest file to identify replacement sequence of bytes pairs. The archive file optimization module(s) 266 may include a class replacer 268. The class replacer 268 may include computer-executable instructions that in response to execution by the processor(s) 252 cause operations to be performed including identifying a first sequence of bytes and a second sequence of bytes in the replacement sequence of bytes pair, where the first sequence of bytes is to be replaced by the second sequence of bytes. The class replacer 268 may retrieve one or more rules and format the second sequence of bytes based at least in part on the one or more rules. The class replacer 268 may then search the one or more compiled code files to find any sequence of bytes that match the first sequence of bytes and replace the first sequence of bytes with the formatted second sequence of bytes.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
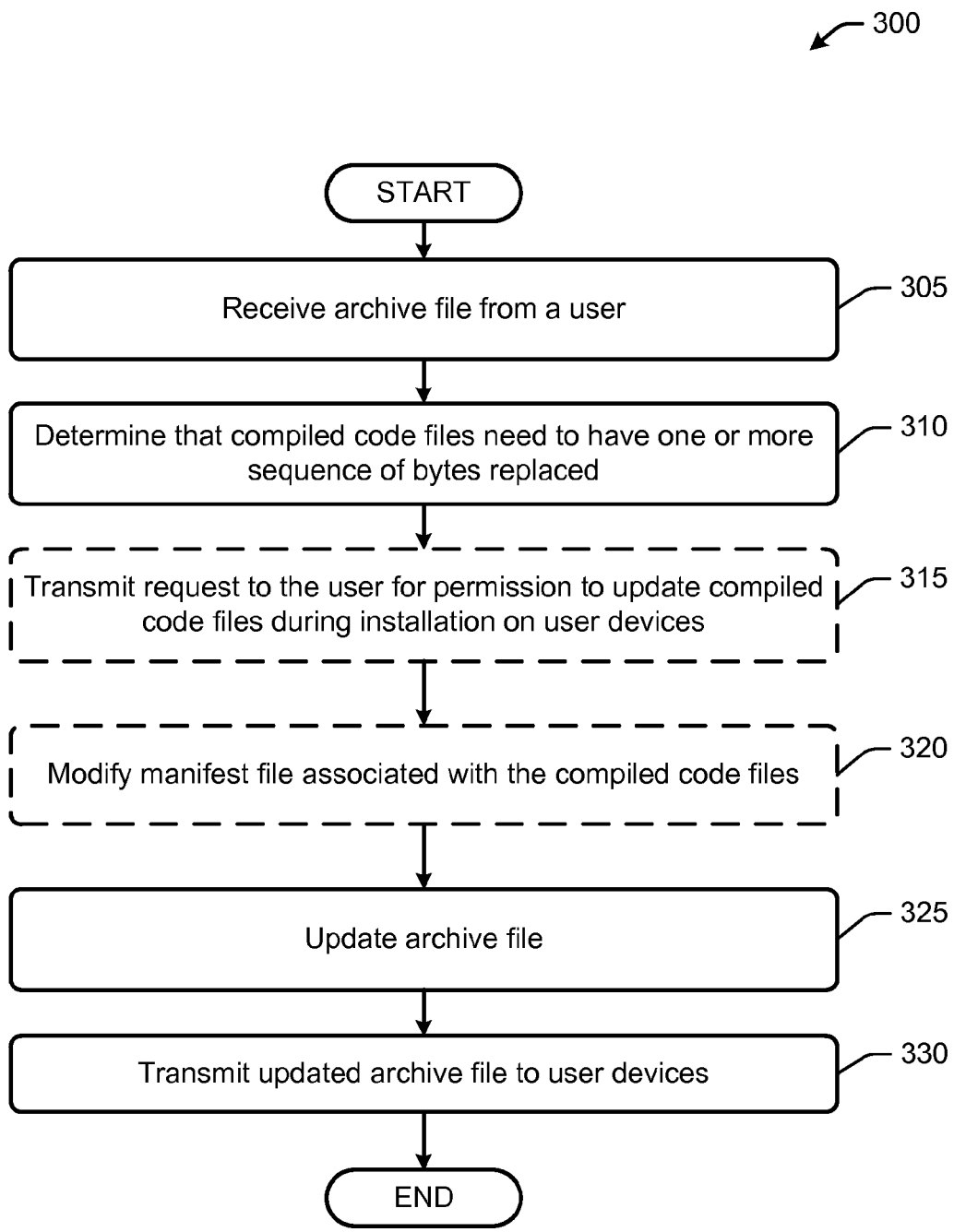
FIG. 3 is a process flow diagram of an illustrative method for modifying a manifest file to initiate a class replacer during application installation in accordance with one or more embodiments of the disclosure.

FIG. 3 is a process flow diagram of an illustrative method for modifying a manifest file to initiate a class replacer during application installation in accordance with one or more embodiments of the disclosure. At block 305, an app store server 108 may receive an archive file from a user 102 (e.g., developer). The archive file may include one or more compiled code files. In some embodiments, the archive file may include one or more resources (e.g., video, text, sounds, images, etc.) and/or metadata. An archive file may be an aggregate of compiled code files, metadata, resources, and a manifest file in a single file that may be used to distribute application software or libraries. Examples of archive files may include Java Archive (JAR) files or Dalvik Executable (DEX) files.

At block 310, an archive file review module 246 of the app store server 108 may determine that the one or more compiled code files need to have one or more sequence of bytes replaced. The archive file review module 246 may unpackage the received archive file and analyze the compiled code files. In some embodiments, the archive file review module 246 may determine if the compiled code files need to be updated by replacing one or more sequence of bytes based at least in part on one or more rules or policies. For example, the rules or policies may indicate that the linkage of the application needs to be changed from the linkage that the application was compiled against. The rules and policies may indicate that in order to work properly on a particular user device, the linkage must be changed at install time of the application.

At block 315, the archive file review module 246 may transmit a request to the user 102 (e.g., developer) for permission or approval to update the compiled code files during installation of the application on the user device. In some embodiments, the request may be a notification by text, email, in-application message, webpage message, or the like. The user 102 may respond indicating their approval to update the compiled code files. If the user 102 responds indicating that they do not approve updating the compiled code files, then the archive file may be transmitted to a requesting user device 110 without any modifications. In some embodiments, block 315 may be optional.

At block 320, the archive file review module 246 may optionally modify the manifest file associated with the compiled code files. In some embodiments, the archive file review module 246 may modify a manifest file associated with the compiled code files in response to receiving approval or permission from the user 102. In some embodiments, the archive file review module 246 may modify a manifest file associated with the compiled code files to add replacement sequence of bytes pairs, where the replacement sequence of bytes pair indicates that a first sequence of bytes may be replaced by a second sequence of bytes. In some embodiments, the user 102 may have provided the replacement sequence of bytes pairs. In some embodiments, the manifest file may be modified based at least in part on rules or policies.

At block 325, the archive file review module 246 may update the archive file. In some embodiments, the archive file may be updated based at least in part on the compiled code files and/or the modified manifest file. In some embodiments, the archive file review module 246 may zip or otherwise aggregate the compiled code files, the modified manifest file, and any other data, such as the manifest file, metadata or resources, into an updated archive file. At block 330, the archive file review module 246 may transmit the updated archive file to one or more user device(s) 110. In some embodiments, the archive review module 246 may transmit the updated archive file to one or more user device(s) in response to receiving a request from the one or more user device(s) to download the archive file.

Figure 4:
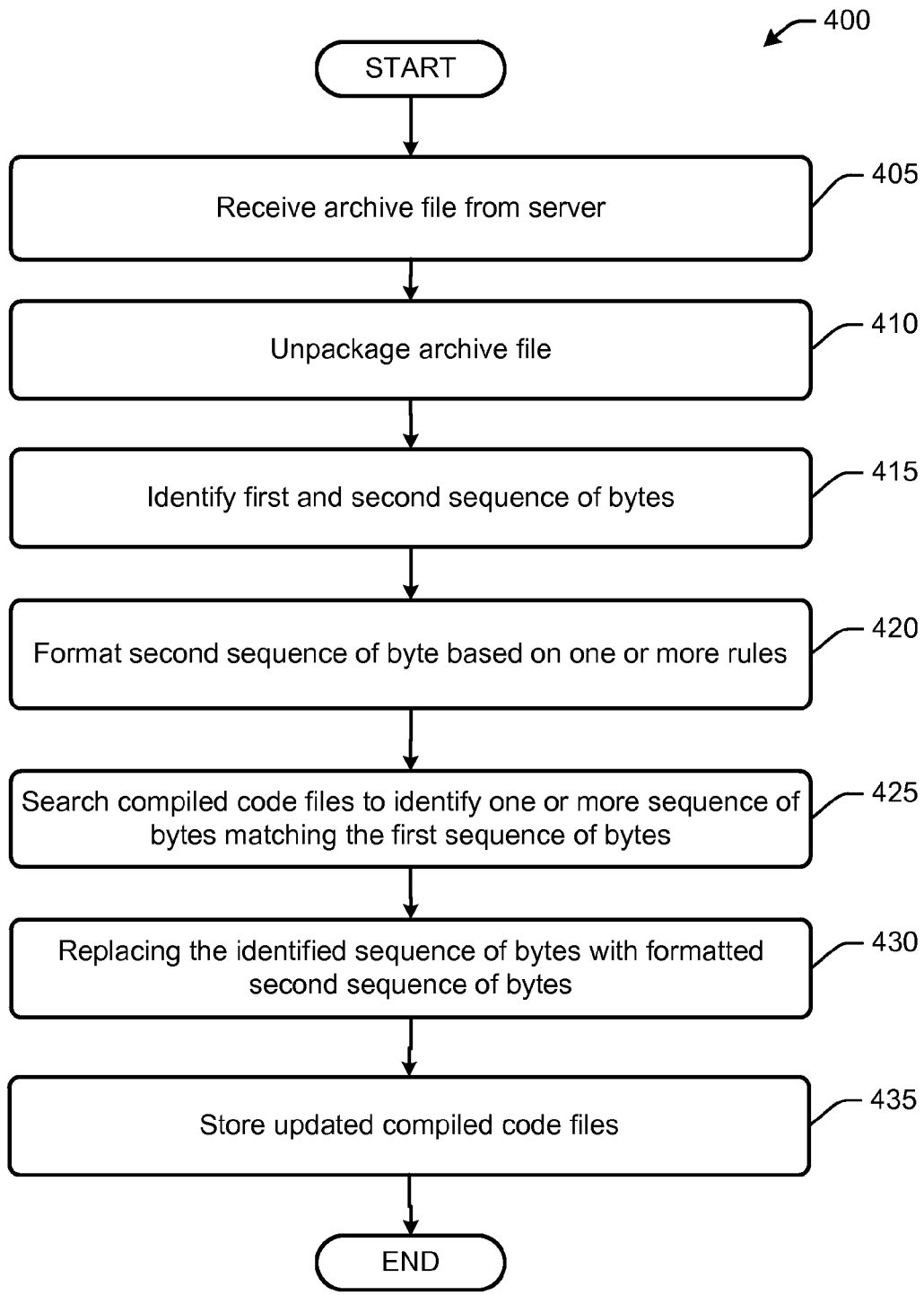
FIG. 4 is a process flow diagram of an illustrative method for a class replacer during application installation in accordance with one or more embodiments of the disclosure.

FIG. 4 is a process flow diagram of an illustrative method for a class replacer during application installation in accordance with one or more embodiments of the disclosure. At block 405, a user device 110 may receive an archive file. In some embodiments, the user device 110 may receive the archive file from a server, another user device 110, or a different source. In some embodiments, the user device 110 may receive an archive file from an app store server 108. The archive file may be received in response to a request for the archive file generated and transmitted by the user device 110.

At block 410, an archive file optimization module 266 may unpackage the archive file. In some embodiments, the archive file may be unzipped and stored in a temporary location. At block 415, the archive file optimization module 266 may identify to identify a first and a second sequence of bytes. In some embodiments, the first sequence of bytes may be the sequence of bytes to search for in the compiled code files from the archive file. The second sequence of bytes may be the sequence of bytes that should replace any found instances of the first sequence of bytes in the compiled code files. In some embodiments, the first and second sequence of bytes may be identified from one or more sources. For example, the first and second sequence of bytes may be identified by parsing a manifest file packaged with the archive file, from tags created by the developer and included with the archive file, from a configuration file, from a command line command, from a library, from a file, or the like.

At block 420, the archive file optimization module 266 may format the second sequence of bytes based at least in part on one or more rules and/or policies. In some embodiments, the archive file optimization module 266 may retrieve the rules and/or policies from a database, may receive the rules and/or policies from the app store server 108, may retrieve the rules and/or policies from a library identified by the manifest file, and/or may otherwise obtain the rules and/or policies from other sources. In some embodiments, formatting may include applying one or more rules to the first and/or second sequence of bytes to simulate output of a compiler.

At block 425, the class replacer 268 may search the compiled code files to identify one or more sequence of bytes matching the first sequence of bytes. In some embodiments, the compiled code files may be an array of strings. The class replacer 268 may loop or otherwise systematically analyze each sequence of bytes in each of the compiled code files to identify one or more sequence of bytes matching the first sequence of bytes. In some embodiments, the class replacer 268 may also loop through or search other data in the archive file, such as the resources and/or metadata, to identify one or more sequence of bytes matching the first sequence of bytes. If there are multiple replacement sequence of bytes pairs, the class replacer 268 may analyze the compiled code files to identify all sequence of bytes identified by the manifest file to be replaced.

At block 430, the class replacer 268 may replace the one or more identified sequence of bytes matching the first sequence of bytes with the second sequence of bytes. The class replacer 268 may update all instances of the identified sequence of bytes matching the first sequence of bytes by replacing the identified sequence of bytes with the second sequence of bytes. At block 435, the archive file optimization module 266 may store the updated compiled code files and additional data, if any, on the user device 110.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
receiving an archive file from a server, wherein the archive file comprises a compiled code file and a modified manifest file that has been modified to include a set of instructions;
unpackaging the archive file to obtain the modified manifest file;
determining that the set of instructions includes first instructions to replace a first sequence of bytes in the compiled code file with a second sequence of bytes, wherein determining that the set of instructions comprises the first instructions comprises parsing the modified manifest file and identifying a tag included in the modified manifest file that indicates that the second sequence of bytes is to be substituted for the first sequence of bytes in the compiled code file;
determining that the set of instructions includes second instructions to replace a third sequence of bytes in the compiled code file with a fourth sequence of bytes;
generating a modified compiled code file from the compiled code file in accordance with at least one of the first instructions or the second instructions included in the manifest file, wherein generating the modified compiled code file comprises:
searching the compiled code file to identify a fifth sequence of bytes matching the first sequence of bytes;
removing the fifth sequence of bytes from the compiled code file;
adding the second sequence of bytes to the compiled code file; and
retaining, in the modified compiled code file, a sixth sequence of bytes in the compiled code file that matches the third sequence of bytes; and
storing the modified compiled code file.

2. The computer-readable medium of claim 1, wherein the archive file further comprises one or more resources or metadata.

3. The computer-readable medium of claim 1, wherein the first sequence of bytes, the second sequence of bytes, the third sequence of bytes, and the fourth sequence of bytes are identified from one or more sources, wherein the one or more sources comprise at least one of a configuration file, the modified manifest file, a command, a library, or a file.

4. A computer-implemented method comprising:
receiving, by one or more processors of a user device, a file comprising a compiled code file and a modified manifest file that has been modified to include a set of instructions;
unpackaging, by the one or more processors, the file to obtain the modified manifest file;
determining that the set of instructions comprises first instructions to replace a first sequence of bytes in the compiled code file with a second sequence of bytes, wherein determining that the set of instructions comprises the first instructions comprises parsing the modified manifest file and identifying a tag included in the modified manifest file that indicates that the second sequence of bytes is to be substituted for the first sequence of bytes in the compiled code file;
determining that the set of instructions comprises second instructions to replace a third sequence of bytes in the compiled code file with a fourth sequence of bytes;
generating, by the one or more processors, a modified compiled code file from the compiled code file in accordance with at least one of the first instructions or the second instructions included in the manifest file, wherein generating the modified compiled code file comprises:
formatting, by the one or more processors, the second sequence of bytes based at least in part on one or more rules to generate a formatted second sequence of bytes;
searching, by the one or more processors, the compiled code file to identify a fifth sequence of bytes matching the first sequence of bytes;
removing, by the one or more processors, the fifth sequence of bytes from the compiled code file;
adding, by the one or more processors, the formatted second sequence of bytes to the compiled code file; and
retaining, in the modified compiled code file, a sixth sequence of bytes in the compiled code file that matches the third sequence of bytes; and
storing, by the one or more processors, the modified compiled code file.

5. The computer-implemented method of claim 4, wherein the compiled code file is a DALVIK executable file.

6. The computer-implemented method of claim 4, wherein the archive file further comprises one or more resources or metadata.

7. The computer-implemented method of claim 6, wherein the one or more resources comprises a string sequence of bytes, an image, a video, or a sound file.

8. The computer-implemented method of claim 4, further comprising:
retrieving, by the one or more processors, the one or more rules from a library identified by the modified manifest file.

9. The computer-implemented method of claim 4, wherein the compiled code file comprises an array of sequences of bytes.

10. The computer-implemented method of claim 9, wherein searching the compiled code file to identify the fifth sequence of bytes matching the first sequence of bytes comprises:
looping, by the one or more processors, through the array of sequences of bytes of the compiled code file to identify the fifth sequence of bytes matching the first sequence of bytes.

11. A system comprising:
at least one memory storing computer-executable instructions; and
at least one processor, wherein the at least one processor is configured to access the at least one memory and to execute the computer-executable instructions to:
receive a file comprising a compiled code file and a modified manifest file;
unpackage the file to obtain the modified manifest file;
determine that the set of instructions comprises first instructions to replace a first sequence of bytes in the compiled code file with a second sequence of bytes, wherein determining that the set of instructions comprises the first instructions comprises parsing the modified manifest file and identifying a tag included in the modified manifest file that indicates that the second sequence of bytes is to be substituted for the first sequence of bytes in the compiled code file;
determine that the set of instructions comprises second instructions to replace a third sequence of bytes in the compiled code file with a fourth sequence of bytes;
generate a modified compiled code file from the compiled code file in accordance with at least one of the first instructions or the second instructions included in the manifest file, wherein the at least one processor is configured to generate the modified compiled code file by executing the computer-executable instructions to:
format the second sequence of bytes based at least in part on one or more rules to generate a formatted second sequence of bytes;

search the compiled code file to identify a fifth sequence of bytes matching the first sequence of bytes;

remove the fifth sequence of bytes from the compiled code file;

add the formatted second sequence of bytes to the compiled code file; and retain, in the modified compiled code file, a sixth sequence of bytes in the compiled code file that matches the third sequence of bytes; and store the modified compiled code file.

12. The system of claim 11, wherein the file further comprises one or more resources or metadata.

13. The system of claim 11, wherein the at least one processor is further configured to execute the computer-executable instructions to:

retrieve the one or more rules from a library identified by the modified manifest file.

14. The system of claim 11, wherein the compiled code file comprises an array of sequences of bytes, and wherein the at least one processor is configured to search the compiled code file to identify the fifth sequence of bytes matching the first sequence of bytes by executing the computer-executable instructions to:

loop through the array of sequences of bytes of the compiled code file to identify the fifth sequence of bytes matching the first sequence of bytes.

15. A computer-implemented method comprising:

receiving a file comprising a compiled code file and a manifest file;

determining, based at least in part on application of a rule, that the compiled code file is to be updated during installation of the file on a user device;

generating a modified manifest file that includes a set of instructions for generating a modified compiled code file during installation of the file on the user device, the set of instructions comprising first instructions to replace a first sequence of bytes in the compiled code file with a second sequence of bytes and second instructions to replace a third sequence of bytes in the compiled code file with a fourth sequence of bytes, wherein the first instructions comprise a tag that is identifiable by parsing the modified manifest file, the tag indicating that the second sequence of bytes is to be substituted for the first sequence of bytes in the compiled code file, and wherein generating the modified compiled code file comprises:

locating a fifth sequence of bytes in the compiled code file that matches the first sequence of bytes;

replacing the fifth sequence of bytes with the second sequence of bytes; and retaining, in the modified compiled code file, a sixth sequence of bytes in the compiled code file that matches the third sequence of bytes;

generating an updated file including the modified manifest file and the compiled code file;

receiving a request from the user device to download the file; and sending the updated file to the user device.

16. The computer-implemented method of claim 15, further comprising:

sending a request to a developer of the file requesting permission to update the compiled code file during installation of the file on the user device; and receiving a response from the developer indicating approval to update the compiled code file during installation of the file on the user device.

17. The computer-implemented method of claim 15, wherein determining, based at least in part on application of the rule, that the compiled code file is to be updated during installation of the file on the user device comprises determining that a linkage of the file is to be changed by replacing the first sequence of bytes in the compiled code file with the second sequence of bytes to ensure that the file is installed on the user device without an exception occurring.

18. The computer-implemented method of claim 15, further comprising:

unpackaging the file to obtain the modified manifest file.

\* \* \* \* \*